United States Patent Office 3,236,256
Patented Feb. 22, 1966

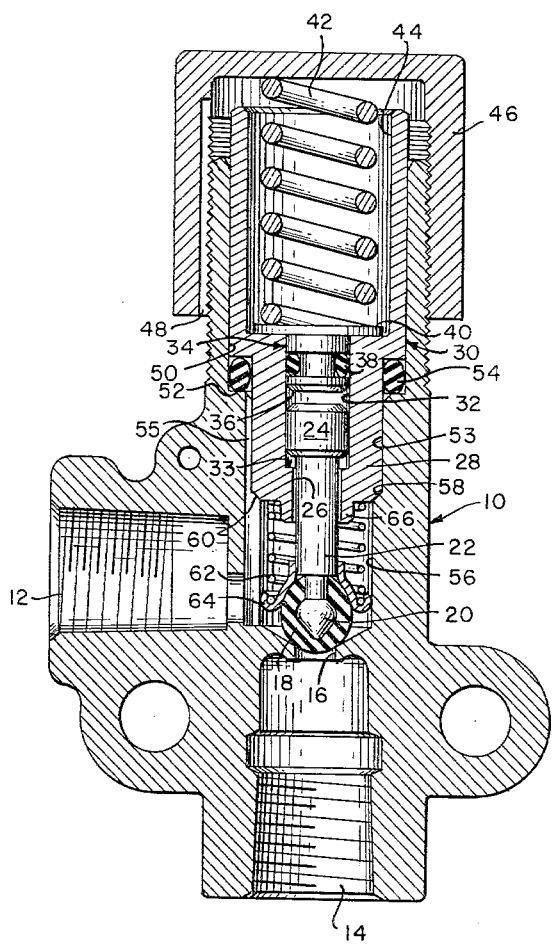

3,236,256
PRESSURE PROTECTION VALVE
Harry M. Valentine, Elyria, Ohio, assignor to Bendix-Westinghouse Automotive Air Brake Company, Elyria, Ohio, a corporation of Delaware
Filed Jan. 28, 1963, Ser. No. 254,376
1 Claim. (Cl. 137—509)

This invention relates to valves and more particularly to pressure responsive spillover or protection valves.

Valves of the class to which the present invention relates usually comprise a casing having a spring loaded pressure responsive member subject to inlet pressure and carrying a valve member which normally closes an outlet port. When the inlet pressure exceeds a predetermined level in excess of the spring load on the pressure responsive member, the latter is moved against the spring load to open the valve member and connect the outlet port with the inlet port. Heretofore, such valves have been arranged so that the valve member is rigidly connected to the pressure responsive member and when the latter is in valve closing position the full force of the spring acting on the pressure responsive member is also exerted on the valve member so that the valve material, which may be rubber or other yieldable substance, is jammed by the full force of the spring against the valve seat. This jamming unduly distorts the valve material and contributes to its early deterioration and consequent failure of the valve.

It is a broad object of the present invention to provide a valve of the class referred to which includes means for eliminating the foregoing problem.

More particularly, it is an object of the invention to provide a spring loaded pressure responsive valve wherein the spring force exerted on the pressure responsive member is at no time exerted on the valve element.

Another object of the invention is to limit the force between the valve element and its seat to a force equal to the force of the valve spring plus the differential force across the valve seat when the valve is pressurized and in seated or lap position.

In accordance with the invention the objects thereof are achieved by providing a valve of the class referred to with stop means within the valve casing which absorbs all the heavy adjusting spring load when the pressure responsive member is in its valve closed position. A lost motion connection is provided between the pressure responsive member and the valve element whereby, after the pressure responsive member has moved away from the stop it picks up the valve element and moves it to its open position. When the pressure responsive member returns in a valve closing direction the fixed stop is so arranged that the valve element first closes the outlet port before the pressure responsive member engages the fixed stop.

The most common use for a valve device of the character of the invention is the simple function of protecting a main source of fluid pressure for a brake system. It also serves to isolate an auxiliary source of fluid pressure from the main source below a predetermined set pressure and in this respect it serves as a protection or spill-over valve.

The invention will now be described in detail in conjunction with the single figure which is a vertical cross sectional view of a pressure protection valve incorporating the features of the invention.

The valve illustrated comprises a casing 10 having an inlet port 12 connected to a source of fluid pressure and a delivery or outlet port 14 which may be connected to an auxiliary source of fluid pressure or to atmosphere. Between the inlet and outlet ports is a valve seat 16 controlled by a valve element 18 which may comprise a sphere of rubbery material snapped over the enlarged head of a valve core 20, which is integral with a valve stem 22 having at its upper end a laterally extending, enlarged cylindrical head 24. The stem 22 extends freely through an opening 26 in a lower reduced diameter extension 28 of a pressure responsive piston 30 with the head 24 being slideably engaged in a cylindrical cavity 32 in the extension 28. As shown, the opening 26 is somewhat larger than the stem 22 in order to provide a clearance around the latter.

The cavity 32 has a lower wall 33 which is spaced below the lower surface of the head 24 and is sealed at its upper end by a fluid tight closure member 34 having a cylindrical part 36 spaced above the upper surface of the head 24 and received in the upper end of the cavity 32. The part 36 is annularly grooved to accommodate an O-ring 38 which sealingly engages the annular surface of the groove and the sidewall of the cavity 32. Integral with the upper end of the member 34 is an enlarged circular disc 40 which serves to retain the member 34 in the position shown as well as serving as a lower seat for a regulating spring 42 received in an enlarged cavity 44 in the piston 30, the upper end of the spring 42 abutting the lower surface of an inverted cup shaped regulating cap 46 which is adjustably threaded to the upper end of the casing 10 and, if desired, may be locked in place by a suitable jam nut (not shown). A vertical groove 48 may be provided on the internal surface of the cap 46 to prevent the trapping of atmospheric air above the piston 30.

The piston 30 is slideably received in a bore 50 in the upper end of the casing with a shoulder 52 being provided between the bore 50 and a second bore 53 of less diameter which slideably receives the extension 28 of the piston. The upper end of extension 28 projects partly into the enlarged bore 50 where it receives an O-ring 54 which is sealingly compressed between the outer surface of the extension 28 and the inner surface of the bore 50 so as to prevent the flow of fluid pressure from the inlet passage 12 to the upper side of the piston 30. Pressure from the inlet passage 12 flows freely to the lower surface of the O-ring 54 by means of a vertical passage 55 formed in the sidewall of the lower cavity 53.

In accordance with the invention the lower part 56 of the smaller bore 53 is of reduced diameter to provide a beveled shoulder 58 which, when the parts of the valve are in the position of the drawing, is engaged by the beveled lower edge 60 of the piston extension 28. As can be seen, the shoulder 58 affords a stop for the piston 30 and positively prevents this member from descending beyond a position established by the shoulder.

When the parts of the valve are in the closed position of the drawing, the dimension of the cavity 32 in the piston extension 28 and the dimensions of the stem 22 and head 24 of the valve element are so correlated with the position of the shoulder 58 that the head 24 is out of engagement with either the lower wall 33 of the cavity 32 or the lower surface of the closure member 34 so that auxiliary resilient means is required to urge the valve element to its closed position. Inasmuch as the inlet pressure acting in opposite direction on the valve element assembly is substantially balanced or is greater in a valve closing direction when the element 18 is engaged with the seat 16, the auxiliary resilient means for urging the valve toward its closed position may comprise merely a very light spring 62 surrounding the stem 22 and interposed between the lower surface of the extension 28 and a spring retainer 64 engaging the upper surface of the element 18. Desirably, the lower surface of the extension 28 is provided with a cylindrical projection 66 to serve as a guide for the upper end of the spring 62.

As shown, the spring retainer 64 has a sliding fit in the bore 56 and is shaped to firmly engage the upper portion of the valve element 18 as well as the lower portion of the stem 22. Thus, due to the clearance around the stem 22, the valve element 18 is self-aligned with respect to its seat 16 and because of the construction of the spring retainer 64, the latter serves the dual purpose of aligning the valve and also sealing against the possibility of air leakage between the valve element 18 and the core 20 which might otherwise cause malfunctioning of the device.

In operation, after the parts of the valve have been assembled the regulating cap 46 would be screwed downwardly so as to compress the regulating spring 42 to a degree giving the desired valve opening pressure. It will be appreciated that inasmuch as the lower edge 60 of the piston extension 28 is in positive engagement with the shoulder 58, except for the spring 42 there is no relative movement between any parts of the valve regardless of the degree to which the spring 42 is compressed. Assume now that the inlet pressure exceeds a predetermined level in excess of the force of the regulating spring 42 so that pressure acting on the lower side of the O-ring 54 and the remaining unbalanced areas of the piston member 30 starts moving the piston upwardly. At this stage, the valve element 18 remains closed because of the force of the light spring 62 plus the unbalanced pressure tending to retain the valve element in its closed position. As the piston 30 continues to rise it reaches a point where the clearance between the lower surface of the head 24 and the lower wall 33 of the cavity or cage 32 is taken up at which point the head is picked up by the lower wall and the valve 18 is moved to its open position thereby connecting the inlet port with the outlet port. Upon this occurrence the pressure at the inlet port commences to blow down and at a pressure less than the opening pressure (due to the added area of the valve seat) the piston commences to return under the influence of the regulating spring 42 until the valve element 18 engages the valve seat 16 to cut off further flow from the inlet to the outlet port. The valve is now in lapped or balanced condition. Any further increase in inlet pressure will cause the valve 18 to leave the seat 16 to permit a spill over of additional pressure to the outlet port; however, this increased pressure also further compresses the spring 42 and upon further increase of inlet pressure the valve 18 is displaced from the critical lapping position so that free communication between the inlet and outlet results and both pressures increase simultaneously to the maximum inlet pressure.

Now upon usage of air, both the outlet and inlet pressure recede uniformly due to the unrestricted communication between the ports. When the pressure in the inlet recedes to the predetermined valve opening pressure, the valve 18 approaches the seat 16 or nears the lap or balanced position. At this point, assuming that the pressure drop is the result of excessive air usage on the downstream or outlet side of the unit, the valve 18 will seal against the seat 16 to isolate and prevent further loss of pressure in the upstream or inlet side of the valve, which is the side of the system to be protected. However, should the excessive pressure drop be the result of conditions existing on the up-stream or inlet side of the unit, the pressure from the outlet will eventually become relatively higher than that of the inlet and will flow by the valve 18 to supplement the inlet pressure and will recede along with it, except lagging it by a pressure equivalent to the differential pressure across the valve seat 16 and the pressure equivalent of the spring 62.

When the load of the spring 42 exceeds the pressure force on the piston 30 the shoulder 60 will come to rest on the shoulder 58 as shown in the figure. Upon a continued loss of pressure the inlet valve 18 will eventually contact the seat 16 and at atmospheric pressure in the inlet a pressure approximately equivalent to the spring 62 will be trapped in the outlet.

From the foregoing it is apparent that under no condition will the load on the valve 18 exceed the force of the spring 62 plus the pressure differential across the valve seat times its area.

Though the lost motion connection shown and described comprises an enlarged head caged in a cavity on the pressure side of the pressure responsive element, it will be apparent that any of a number of lost motion arrangements could be provided which, in lieu of a cage, could utilize any other suitable arrangement wherein a part carried by the valve element is normally spaced above but in the path of movement of a second part carried by the pressure responsive piston and which would engage the valve element part to unseat the valve element after the piston has been moved away from the stop means afforded by the shoulder 58. It will also be apparent that positive stop means other than that shown would be within the purview of the invention. Thus the invention is susceptible of a wide variety of changes and modifications without departing from the scope and spirit of the appended claim.

What is claimed is:

In a pressure responsive valve including a casing having fluid pressure inlet and outlet chambers, a valve element normally closed upon a valve seat in the direction of fluid flow for controlling the flow of fluid pressure between said inlet and outlet chambers, and a pressure responsive element subjected to opposing forces of resilient means and pressure in said inlet chamber and movable in opposite directions in response to the greater of the opposing forces, the invention which comprises stop means in said casing for positively limiting the travel of said pressure responsive element in response to said resilient means, a lost motion connection between said pressure responsive element and valve element, said connection comprising a pair of cooperating parts respectively carried by said elements, the part carried by said valve element including a stem and an enlargement carried on one end of the stem a spaced distance from said valve element, the part carried by said pressure responsive element comprising an integral cage having a wall provided with an axial elongated opening of slightly greater diameter than that of the stem, said stem projecting through said opening into the interior of said cage, a shoulder formed at the juncture of said opening and said wall, said enlargement being positioned a spaced distance above said shoulder when said valve element is in a closed position so as to be engaged thereby to open said valve element after predetermined movement of said pressure responsive element away from said stop means, and means for ensuring alignment of said valve element with respect to its seat comprising a member carried by the valve element and slidably engaging the wall of said inlet chamber, the valve element including a core secured to the other end of said stem by a part having a cross sectional area less than that of the stem and including also a spherical shaped resilient member surrounding said core and part, said member carried by the valve element comprising a spherical shaped part firmly engaging the entire surface of the resilient member adjacent the other end of the stem and comprising also a cylindrical part firmly engaging the other end portion of said stem and resilient means interposed between said pressure responsive element and said last-named member for ensuring said firm engagement between said spherical part and the said entire surface of the resilient member to prevent air leakage between the resilient member and the core.

References Cited by the Examiner

UNITED STATES PATENTS

| | | | |
|---|---|---|---|
| 1,040,226 | 10/1912 | DeLukacsevics | 251—333 X |
| 2,181,428 | 11/1939 | Grove | 137—509 |
| 3,087,510 | 4/1963 | Normand | 137—509 |
| 3,127,845 | 4/1964 | Voelcker | 137—539.5 X |

FOREIGN PATENTS 1,094,067 12/1960 Germany.

ISADOR WEIL, *Primary Examiner.*